(12) United States Patent
Rosati et al.

(10) Patent No.: US 11,151,316 B2
(45) Date of Patent: Oct. 19, 2021

(54) WEBPAGE MODIFICATION ALERT SYSTEM

(71) Applicant: International Business Machines Corporation, Armonk, NY (US)

(72) Inventors: Leonardo Rosati, Rome (IT); Andrea Di Maio, Naples (IT); Andrea Durastante, Rome (IT); Cristina Bonanni, Rome (IT)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/452,677

(22) Filed: Jun. 26, 2019

(65) Prior Publication Data

US 2020/0410046 A1     Dec. 31, 2020

(51) Int. Cl.
*G06F 40/197*   (2020.01)
*G06F 40/143*   (2020.01)
*G06F 40/134*   (2020.01)

(52) U.S. Cl.
CPC .......... *G06F 40/197* (2020.01); *G06F 40/134* (2020.01); *G06F 40/143* (2020.01)

(58) Field of Classification Search
CPC .... G06F 40/197; G06F 40/143; G06F 40/134; G06F 16/9558
See application file for complete search history.

(56) References Cited

U.S. PATENT DOCUMENTS

| 5,898,836 | A | 4/1999 | Freivald et al. |
| 7,323,999 | B2 | 1/2008 | Heidloff et al. |
| 7,487,183 | B1 | 2/2009 | Schmidt |
| 8,943,197 | B1 | 1/2015 | Taylor et al. |
| 9,313,288 | B2 | 4/2016 | Thrasybule et al. |
| 2004/0044696 | A1* | 3/2004 | Frost ...................... G06Q 10/10 |
| 2010/0017701 | A1 | 1/2010 | Bargeron et al. |
| 2011/0225142 | A1* | 9/2011 | McDonald ............ G06F 21/552 707/710 |
| 2013/0246901 | A1* | 9/2013 | Massand ................ G06Q 10/10 715/229 |
| 2014/0281870 | A1 | 9/2014 | Vogel et al. |
| 2014/0359411 | A1* | 12/2014 | Botta .................... G06F 40/197 715/205 |
| 2016/0162594 | A1* | 6/2016 | Seacat DeLuca ... G06F 16/9558 715/208 |
| 2018/0039683 | A1 | 2/2018 | Bonanni et al. |
| 2018/0097877 | A1* | 4/2018 | Johnson .................. H04L 67/06 |
| 2020/0242660 | A1* | 7/2020 | Gottlieb ............ G06Q 30/0248 |

FOREIGN PATENT DOCUMENTS

| EP | 1111518 A1 | 6/2001 |
| WO | 2017185463 A1 | 11/2017 |

* cited by examiner

*Primary Examiner* — Thu V Huynh
(74) *Attorney, Agent, or Firm* — William H. Hartwell; Isaac J. Gooshaw

(57) ABSTRACT

A webpage notification control system is provided. A computing device monitors a plurality of website content stored on a database. A computing device identifies one or more anchor contents associated with the plurality of website content stored on a database. A computing device detects changes made to one or more data contents associated with the plurality of website content stored on a database. A computing device generates an alert based, at least in part, on the detection of a change made to one or more data contents associated with the plurality of website content.

20 Claims, 4 Drawing Sheets

WEBPAGE MODIFICATION ALERT SYSTEM

BACKGROUND OF THE INVENTION

The present invention relates generally to the field of webpage management, and more particularly to notification control.

Information contained within pages under website construction, such as draft documents or source code, change continuously during development or maintenance of the website. Authorized subscribers have access to the website pages and the authorized subscribers are notified regularly of each change that occurs to the website.

SUMMARY

Embodiments of the present invention provide a method, system, and program product for a webpage notification control system.

A first embodiment encompasses a method for webpage notification control system. One or more processors monitor a plurality of website content stored on a database. The one or more processors identify one or more anchor contents associated with the plurality of website content stored on a database. The one or more processors detect changes made to one or more data contents associated with the plurality of website content stored on a database. The one or more processors generate an alert based, at least in part, on the detection of a change made to one or more data contents associated with the plurality of website content.

A second embodiment encompasses a computer program product for webpage notification control system. The computer program product includes one or more computer-readable storage media and program instructions stored on the one or more computer-readable storage media. The program instructions include program instructions to monitor a plurality of website content stored on a database. The program instructions include program instructions to identify one or more anchor contents associated with the plurality of website content stored on a database. The program instructions include program instructions to detect changes made to one or more data contents associated with the plurality of website content stored on a database. The program instructions include program instructions to generate an alert based, at least in part, on the detection of a change made to one or more data contents associated with the plurality of website content.

A third embodiment encompasses a computer system for webpage notification control system. The computer system includes one or more computer processors, one or more computer readable storage medium, and program instructions stored on the computer readable storage medium for execution by at least one of the one or more processors. The computer program product includes one or more computer-readable storage media and program instructions stored on the one or more computer-readable storage media. The program instructions include program instructions to monitor a plurality of website content stored on a database. The program instructions include program instructions to identify one or more anchor contents associated with the plurality of website content stored on a database. The program instructions include program instructions to detect changes made to one or more data contents associated with the plurality of website content stored on a database. The program instructions include program instructions to generate an alert based, at least in part, on the detection of a change made to one or more data contents associated with the plurality of website content.

DETAILED DESCRIPTION

Figure 1:
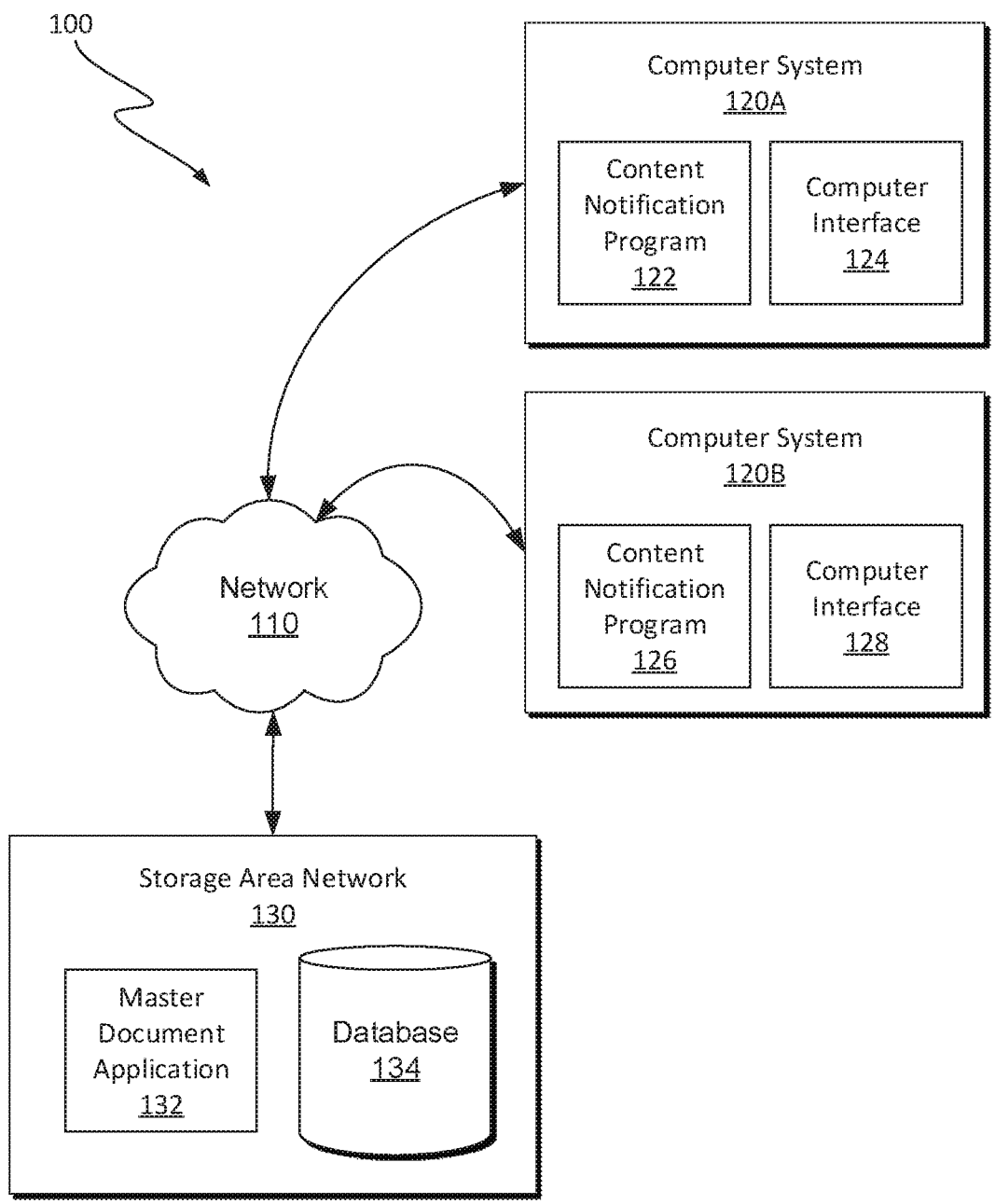
FIG. 1 is a functional block diagram illustrating a computing environment, in which document modification is managed by a notification control, in accordance with an exemplary embodiment of the present invention.

Detailed embodiments of the present invention are disclosed herein with reference to the accompanying drawings. It is to be understood that the disclosed embodiments are merely illustrative of potential embodiments of the present invention and may take various forms. In addition, each of the examples given in connection with the various embodiments is intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

While possible solutions to notification control are known, these solutions may be inadequate to maintain balance and proportionality to the amount of notification a user receives based, at least, on the modifications to website content. While it is important that a user receive notifications regarding each and every change and/or modification to a document, it would be cumbersome to a user to review and analyze each notification that the user receives.

In general, notification control applications generate a notification or alert and communicate the notification or alert to a user each time a change and/or modification occurs to a document. The notification control generally requires that the user develop and submit criteria for when the user would like to receive notifications. In another situation, the user can apply a filtering system to filter the notification so that the user receives only the notifications they wish to receive. In general, notification control applications utilize filtering or identified criteria to communicate only the notifications to the user that the user wishes to receive.

Embodiments of the present invention recognize that the information in the pages of a web site under construction, in a draft document of a web site, and/or in the source code of a web site during development or maintenance phases can undergo multiple changes within a given time period. Embodiments of the present invention recognize that authorized subscribers are regularly notified of such changes. Embodiments of the present invention recognize that optimization for notification control offers users the ability to receive notifications regarding each change and/or modification to a document without being encumbered by large quantity of alerts communicated to the user for each individual change and/or modification to a document. Instead of generating a filtering process or requesting the user to submit criteria based on user preferences of which notifications to receive, the use of link sets and delaying the communication of notification until the application determines that no more changes are to be made and communicating a single alert to a user is beneficial, because it may be less burdensome on the user. Such an approach may yield an increase in productivity in management of the changes and/or modification to website content shared over distributed databases of website content and collaborative editing. As used hereinafter, the term website content refers to one or a combination of the pages of a web site under construction, in a draft document of a web site, and/or in the source code of a web site.

In one embodiment, master document application 132 monitors a plurality of website content stored on a database. Master document application 132 identifies one or more anchor contents associated with the plurality of website content stored on a database. Master document application 132 detects changes made to one or more data contents associated with the plurality of website content stored on a database. Master document application 132 generates an alert based, at least in part, on the detection of a change made to one or more data contents associated with the plurality of website content.

In one embodiment, content notification program 122 generates one or more link sets associated with (i) one or more data contents, (ii) one or more master website content and (iii) at least, one alert. In another embodiment, master document application 132 generates one or more link sets associated with (i) one or more data contents, (ii) one or more master website content and (iii) at least, one alert. Master document application 132 identifies one or more data contents associated with one or more master website content. Master document application 132 assigns one or more data contents to, at least, one link set. Master document application 132 stores the one or more link sets on database 134.

In one embodiment, master document application 132 identifies one or more master website content on database 134. Master document application 132 retrieves one or more master document from database 134. Master document application 132 populates the one or more master website content on computer system 120A. Master document application 132 scans one or more master website content. Master document application 132 generates a local copy of the master document on computer system 120A. Responsive to generating a local copy, master document application 132 stores the local copy on a computer system 120A. In another embodiment, content notification program 122 communicates program instructions to master document application 132 to populate one or more master website content on computer system 120A. In another embodiment, content notification program 122 scans one or more master website content. Content notification program 122 generates a local copy of the master document on computer system 120A. Responsive to generating a local copy, content notification program 122 stores the local copy on computer system 120A.

In one embodiment, master document application 132 monitors one or more master website content stored on database 134. Master document application 132 detects activity associated, at least, with one or more data contents associated, at least, with the one or more master website content. Master document application 132 identifies changes made to one or more data contents associated with the one or more master website content. Master document application 132 generates a commentary data list. Master document application 132 stores the commentary data list on database 134.

In one embodiment, master document application 132 monitors one or more master website content stored on a database. Master document application 132 detects one or more changes made to one or more data contents associated with one or more master website content stored on a database. Responsive to detecting one or more changes made to one or more data contents associated with one or more master website content, master document application 132 identifies one or more link sets associated with the one or more data contents that had been changed. Master document application 132 generates an alert based, at least in part, on the detection of one or more changes made to one or more data contents associated with one or more master website content. Master document application 132 communicates the alert to computer system 120A.

In one embodiment, master document application 132 communicates an alert to a computer system based, at least in part, on the detection of one or more changes made to one or more data contents associated with one or more master website content stored on database 134. Responsive to communicating an alert to computer system 120A based, at least in part, on the detection of one or more changes made to one or more data contents associated with one or more master website content stored on a database, master document application 132 monitors one or more master website content stored on database 134 for additional changes made to one or more data contents associated with the one or more master website content. Master document application 132 identifies additional changes made to one or more data contents associated with one or more master website content that include, but are not limited to, data contents that have had, at least, one previously communicated alert associated with the data contents. Master document application 132 generates a commentary data list based, at least in part, on the additional changes made to one or more data contents associated with one or more master website content. Master document application 132 communcat3s a commentary data list to computer system 120A.

In one embodiment, master document application 132 monitors one or more master website content stored on database 134. Master document application 132 identifies, at least, one change made to one or more data contents associated with one or more master website content. Responsive to identifying, at least, one change made to one or more data contents associated with one or more master website content, master document application 132 delays the generation of an alert. Responsive to delaying the generation of an alert, master document application 132 monitors the one or more master website content for additional changes made to, at least one data content associated with the one or more master website content. Master document application 132 detects one or more changes made to, at least one data content. Master document application 132 aggregates the one or more changes made to the, at least, one data content. Master document application 132 generates a single alert based, at least in part, on the one or more changes made to the, at least, one data content. Master document application 132 communicates a single alert to computer system 120A.

The present invention will now be described in detail with reference to the figures.

FIG. 1 is a functional block diagram illustrating computing environment, generally designated 100, in accordance with one embodiment of the present invention. Computing environment 100 includes computer system 120A, computer system 120B and storage area network (SAN) 130 connected over network 110. Computer system 120A includes content notification program 122 and computer interface 124, and computer system 120B includes content notification program 126 and computer interface 128. Storage area network 130 includes master document application 132 and database 134. In various embodiments, computing environment 100 can include any number of computer systems (not shown) that operate similarly with respect to computer system 120A and computer system 120B.

In various embodiments of the present invention, computer system 120A and computer system 120B are computing devices that can be a standalone device, a server, a laptop computer, a tablet computer, a netbook computer, a personal computer (PC), a personal digital assistant (PDA), smartwatch, a desktop computer or any programmable electronic device capable of receiving, sending, and processing data, respectively. In general, computer system 120A and computer system 120B represent any programmable electronic device or combination of programmable electronic devices capable of executing machine readable program instructions and communication with SAN 130, respectively. In another embodiment, computer system 120A and computer system 120B represents a computing system utilizing clustered computers and components to act as a single pool of seamless resources, respectively. In general, computer system 120A and computer system 120B can be any computing device or a combination of devices with access to SAN 130 and network 110 and is capable of executing content notification program 122 and computer interface 124, and content notification program 126 and computer interface 128, respectively. Computer system 120A and computer system 120B may include internal and external hardware components, as depicted and described in further detail with respect to FIG. 1.

Storage area network (SAN) 110 is a storage system that includes master document application 132 and database 134. SAN 130 may include one or more, but is not limited to, computing devices, server, server-clusters, webservers, database and storage devices. SAN 130 operates to communicate with computer system 120A and computer system 120B over a network, such as network 110. For example, SAN 130 communicates with content notification program 122 and content notification program 126 to transfer data between, but is not limited to, database 134. The present invention recognizes that FIG. 1 may include (not shown) any number of computing devices, server, databases, and/or storage devices, and the present invention is not limited to what is depicted in FIG. 1.

In this exemplary embodiment, content notification program 122 and computer interface 124 are stored on computer system 120A. In another embodiment, content notification program 126 and computer interface 128 are stored on computer system 120B. However, in various embodiments content notification program 122, computer interface 124, content notification program 126 and computer interface 128 may be stored externally and accessed through a communication network, such as network 110. Network 110 can be, for example, a local area network (LAN), a wide area network (WAN) such as the Internet, or a combination of the two, and may include wired, wireless, fiber optic or any other connection known in the art. In general, network 110 can be any combination of connections and protocols that will support communications between computer system 120A, computer system 120B and SAN 130.

Computer system 120A includes computer interface 124. Additionally, computer system 120B includes computer interface 128. Computer interface 124 and computer interface 128 provide an interface between computer system 120A and SAN 130, and computer system 120B and SAN 130, respectively. In some embodiments, computer interface 124 and computer interface 128 can be a graphical interface (GUI) or a web user interface (WUI) and can display text, documents, web browser, windows, user options, application interfaces, and instructions for operation, and includes the information (such as graphic, text, and sound) that a program presents to a user and the control sequences the user employs to control the program. In some embodiments, computer system 120A and computer system 120B access data communicated from SAN 130 via client-based application that runs on computer system 120A and computer system 120B. For example, computer system 120A and computer system 120B include mobile application software that provides an interface between computer system 120A and computer system 120B and SAN 130, respectively.

In the embodiment depicted in FIG. 1, content notification program 122 and content notification program 126, at least in part, has access to computer interface 124 computer interface 128, respectively, and can communicate data stored on SAN 130 to computer system 120A and computer system 120B, respectively. More specifically, computer interface 124 and computer interface 128 define a user of computer system 120A and a user of computer system 120B, wherein, the user of computer system 120A and the user of computer system 120B have access to data stored on SAN 130.

Embodiments of the present invention recognize that computing environment 100 may utilizes any combination of storage types to store data, including, but not limited to, various types of hardware, data formats, and database structures, and combinations thereof. In general, the present invention may utilize two or more different types of storage to store data, so long as one type of storage (i) requires less space, (ii) can be more readily accessible by content notification program 122 and content notification program 126 that has access to computer interface 124 and computer interface 128, respectively, and/or (iii) has a lower associated cost when compared to the other type of storage. In such embodiments, a cost for storage may be determined based on, but is not limited to, one, or a combination of, power consumption, network bandwidth consumption, a number of required clock cycles, time required to transfer and/or retrieve data, and storage space consumed in a data storage medium. Persons having ordinary skill in the art will understand that storage space of any type of storage is consumed when data is stored using that type of storage.

In the embodiment depicted in FIG. 1, content notification program 122 utilizes, at least in part, the data stored on database 134 to manage access to computer interface 124 in response to a modification alert from master document application 132 (i.e., from the accessible document stored on SAN 130 that is accessible by a plurality of hosts and/or users). More specifically, content notification program 122 defines a modification alert that represents one or more modifications about a document by authorized users.

Content notification program 122, computer interface 124, content notification program 126 and computer interface 128 are depicted in FIG. 1 for illustrative simplicity, computer system 120A and computer system 120B, however, can include any number of logics and/or applications that are managed in accordance with content notification program 122 and content notification program 126, respectively. In general, content notification program 122 and content notification program 126 represents a physical or virtual resource to which the user represented by computer system 120A and computer system 120B, respectively, wishes to manage access. In some embodiments, content notification program 122 and content notification program 126 represents information and computer interface 124 and computer interface 128 represents code that provides an ability to take specific action with respect to another physical or virtual resource and computer interface 124 and computer interface 128 manages the ability to take such actions. In yet some embodiments, content notification program 122 and content notification program 126 represents control over a physical or virtual resource and computer interface 124 and computer interface 128 manages the ability to use and modify the resource. Content notification program 122 and content notification program 126 can also represent any combination of the aforementioned elements. To illustrate various aspects of the present invention, examples of content notification program 122 and content notification program 126 are presented in which content notification program 122 and content notification program 126 represents one or more of: modification alert, anchor content request, or a user profile transaction, are presented, but embodiments of content notification program 122 and content notification program 126 are not limited thereto. Embodiments of the present invention recognize that content notification program 122 and content notification program 126 may include other forms of transactions, request and/or actions that are known in the art.

Master document application 132 is depicted in FIG. 1 for illustrative simplicity, SAN 130, however, can include any number of programs and/or applications that are managed in accordance with master document application 132. In general, master document application 132 represents a physical or virtual resource to which the administrator of the program represented by SAN 130 wishes to manage access. In some embodiments, master document application 132 presents information and database 134 manages the ability to retrieve the information. In some embodiments, master document application 132 represents code that provides an ability to take specific action with respect to another physical or virtual resource. In some embodiments, master document application 132 represents control over a physical or virtual resource and manages the ability to use and modify the resource. Master document application 132 can also represent any combination of the aforementioned elements. To illustrate various aspects of the present inventions, examples of master document application 132 are presented in which master document application 132 represents one or more of: modification alert, anchor content request, or a user profile transaction, are presented, but embodiments of master document application 132 are not limited thereto. Embodiments of the present invention recognize that master document application 132 may include other forms of transactions that are known in the art.

In some embodiments of the present invention, content notification program 122 operates to communicate with SAN 130 to identify data stored on database 134. Data stored on database 134 can include, but is not limited to, website content (e.g., master documents), user preferences, modification alert, anchor content request, or a user profile transaction. Website content stored on database 134 can include, individually or any combination of, but are not limited to, text documents, source code, or webpage documents. Content notification program 122 operates to identify website content that computer interface 124 wishes to manage access (i.e., user of computer system 120A). In various embodiments, master website content represents, but is not limited to, pages of a web site, draft documents of a web site, the source code of a web site, text documents, and/or webpage documents that are accessible by one or more authorized users of a computer system (i.e., computer system 120A and computer system 120B). Additionally, master website content comprises of data content (i.e., anchor content) that includes, but is not limited to, text, images, videos or various digital pictures. In some embodiments, content notification program 126 operates to communicate with SAN 130 to identify data stored on database 134, similarly to content notification program 122.

In various embodiments, content notification program 122 operates to communicate with master document application 132 to authorize the user of computer system 120A. Utilizing computer interface 124, content notification program 122 receives user credentials, which include, but are not limited to, PINs, username and passwords, biometrics, etc., which are leveraged by master document application 132 to provide the user of computer system 120A access to a plurality of master website content stored on database 134, to which the authorized user of computer system 120A has access to. In various embodiments, content notification program 122 operates to identify one or more master website content stored on database 134. Content notification program 122 retrieves one or more master website content from database 134 and populates the master website content on computer interface 124. Content notification program 122 generates a local copy of the one or more master website content and stores the local copy on computer system 120A. Content notification program 122 operates to select one or more anchor contents located on the master document. Content notification program 122 generates a link set, that includes, one or more anchor contents from one or more master website content. Content notification program 122 stores the link set of computer system 120A. Content notification program 122 communicates the link set to master document application 132 with program instructions to communicate modification alerts to content notification program 122 when alterations, modifications, amendments, or any other actions that change the data of the one or more selected anchor contents of the master document.

In various embodiments of present invention depicted in FIG. 1, content notification program 122 operates to update the link set, when content notification program 122 receives modification alerts from master document application 132. In one embodiment and example, content notification program 122 receives a first modification alert that a given anchor content from a first master document has been changed. Content notification program 122 retrieves the link set stored on computer system 120A and updates the status of the link set from normal to warning. Content notification program 122 communicates the updated link set with the status change to computer interface 124. In this embodiment and example, content notification program 122 receives a second modification alert that the given anchor content from the first master document has been changed. Content notification program 122 stores the second modification alert on computer system 120A and updates the link set with second modification alert. Additionally, content notification program 122 does not communicate the second modification alert to computer interface 124. Content notification program 122 operates to update the link set based, at least in part, on the second modification alert, however, content notification program 122 does not communicate a second updated link set, based on the second modified link set, to computer interface 124 to reduce the volume of alerts populated on computer interface 124.

In various embodiments of the present invention, the user of computer system 120A (i.e., computer interface 124) utilizes content notification program 122 to access one or more master website content stored on SAN 130. In some embodiments, content notification program 122 receives a set of program instructions from computer interface 124 to access one or more master website content stored on SAN 130. In one embodiment, content notification program 122 receives program instructions from computer interface 124 to generate one or more link sets (e.g., link set1, link set2, link set3, etc.). Additionally, content notification program 122 receives program instructions from computer interface 124 to access data (i.e., master website content) stored on SAN 130 and identify data that the user of computer system 120A is authorized to access. Content notification program 122 identifies one or more master website content stored on database 134. In one embodiment, content notification program 122 operates to select portions of one or more master website content (e.g., one or more anchor contents) based, at least in part, on the program instructions received from computer interface 124, and stores the select portions of the master website content as local website content on computer system 120A. In a second embodiment, content notification program 122 operates to assign selected anchor contents from one or more master website content to a first link set (i.e., link set1), and assigns select anchor contents from one or more master website content to, at least, a second link set (link set2). In one example, content notification program 122 operates to select a first portion (i.e., a first anchor content) from a first master document and assigns the first portion to a first link set (i.e., link set1) and stores the first portion as a local document on computer system 120A. Additionally, in this example, content notification program 122 operates to select the first portion from a first master document and to select a third portion from a second master document and assigns these portions from the master website content to, at least, a second link set (i.e., link set2) and stores the second link set on computer system 120A.

In various embodiments, content notification program 122 communicates a set of program instructions to master document application 132. Program instructions can include, but are not limited to, instructions to communicate modification alerts to content notification program 122 when a change is made to a selected anchor content by, at least, a second authorized user. In another embodiment, master document application 132 monitors the data stored on database 134 and identifies when the anchor content on a master document has been changed by an authorized user. In one example and embodiment, master document application 132 identifies when, at least, one authorized user changes one or more anchor contents on, at least, a first master document. Master document application 132 generates a modification alert based, at least in part, on the change to the one or more anchor contents on the, at least, first master document. In one embodiment, content notification program 122 operates to communicate with master document application 132 to request one or more modification alerts. In another embodiment, master document application 132 receives program instructions from content notification program 122 instructing master document application 132, at least, to communicate modification alerts based, at least in part, on master document application 132 identifying changes made to one or more anchor contents of one or more master website content. In various embodiments, master document application 132 communicates modification alerts during timely intervals that are established, at least, by program instructions received from content notification program 122. In some embodiments, time intervals can include, but are not limited to, at the top of every hour, at the top of every two hours, at the top of every four hours, every four hours during a 24-hour day cycle, etc. One having ordinary skill in the art understands that timely intervals illustrate various time standards and that various options for time intervals can be leveraged by in various embodiments of the present invention.

In various embodiments of the present invention, computer system 120A, computer system 120B and various computer systems (not shown) are authorized to access one or more master website content stored on database 134. As recognized above, content notification program 122, content notification program 126 and various programs, operating on various computer systems (not shown), identifies one or more master website content stored on database 134. Content notification program 122, content notification program 126 and various programs, operating on various computer system (not shown) retrieve one or more master website content stored on database 134. In various embodiments, content notification program 122, content notification program 126 and various computer programs, operating on computer systems (not shown), operate to make changes to the one or more master website content. In one embodiment and example, the master document represents a webpage document that includes, but is not limited to, text and digital images. Content notification program 122, content notification program 126 and various programs, operating on computer systems (not shown), operate to change the text and/or digital images on the webpage document. In various embodiments, content notification program 122, content notification program 126 and various computer programs, operating on computer systems (not shown) communicate program instructions to master document application 132, instructing master document application 132 to monitor and identify when changes have been made to the one or more master website content stored on database 134. Additionally, the program instructions include instructions to generate modification alerts and communicate the modification alerts to content notification program 122, content notification program 126 and various programs, operating on computer systems (not shown), when changes are made to the one or more master website content. In one embodiment and example, master document application 132 communicates modification alerts to content notification program 122 when content notification program 126 and/or various computer programs, operating on computer systems (not shown), change one or more anchor contents on one or more master website content that content notification program 122 has assigned to a link set (i.e., link set1, link set2, etc.). In a second embodiment and example, master document application 132 communicates modification alerts to content notification program 126 when content notification program 122 and/or various computer programs, operating on computer systems (not shown), change one or more amchur contents on one or more master website content that content notification program 122 has assigned to a link set (i.e., link set1, link set2, etc.).

In various embodiments of the present invention, content notification program 122, content notification program 126 and various computer programs, operating on computer systems (not shown) that are authorized to access one or more master website content stored on database 134, operate to receive modification alerts from master document application 132. In some embodiments, content notification program 122, content notification program 126 and various computer programs, operating on computer systems (not shown), operate to aggregate the one or more modification alerts and store the alerts on their respective computer systems. In various embodiments of the present invention, master document application 132 operates to generate a commentary data list associated, at least, with the one or more changes made to a singular anchor content. The present invention recognizes that one or more anchor contents located on one or more master website content can be changed, and the present invention recognizes that a plurality of commentary data lists can be generated based, at least in part, on a plurality of anchor contents associated with a plurality of master website content. In some embodiments, master document application 132 generates a commentary data list for a first anchor content located on a first master document based, at least in part, on the identification that one or more changes have been made to the first anchor content located on a first master document. In various embodiments, master document application 132 identifies that a plurality of changes has been made to a plurality of anchor contents associated with one or more master website content. Additionally, master document application 132 generates a commentary data list for each individual anchor content that was changed, wherein, master document application 132 identified that changes had been made to the plurality of anchor contents. Master document application 132 stores each commentary data list, associated with an anchor content, on SAN 130. Additionally, content notification program 122, content notification program 126 and various computer programs, operating on computer systems (not shown), operate to communicate a single alert to computer interface 124, computer interface 128 and various computer interfaces, operating on computer systems (not shown), regarding the modification alert of a specified anchor content. In one example and embodiment, based, at least, on the program instructions provided by content notification program 122, master document application 132 communicates one or more modification alerts to content notification program 122 regarding changes made to a first anchor content on a first master document, that content notification program 122 has assigned to link set1. In some embodiments, content notification program 122 communicates an anchor content request to master document application 132, requesting modification alerts of anchor contents that content notification program 122 has assigned to one or more link sets. Content notification program 122 aggregates the one or more modification alert, regarding a first anchor content on a first master document and stores the modification alerts on computer system 120A for computer interface 124 to access at a later time. In some embodiments, content notification program 122 communicates a single alert to computer interface 124 that a change has been made to a first anchor content on a first master document and stores any additional modification alerts on computer system 120A.

Figure 2:
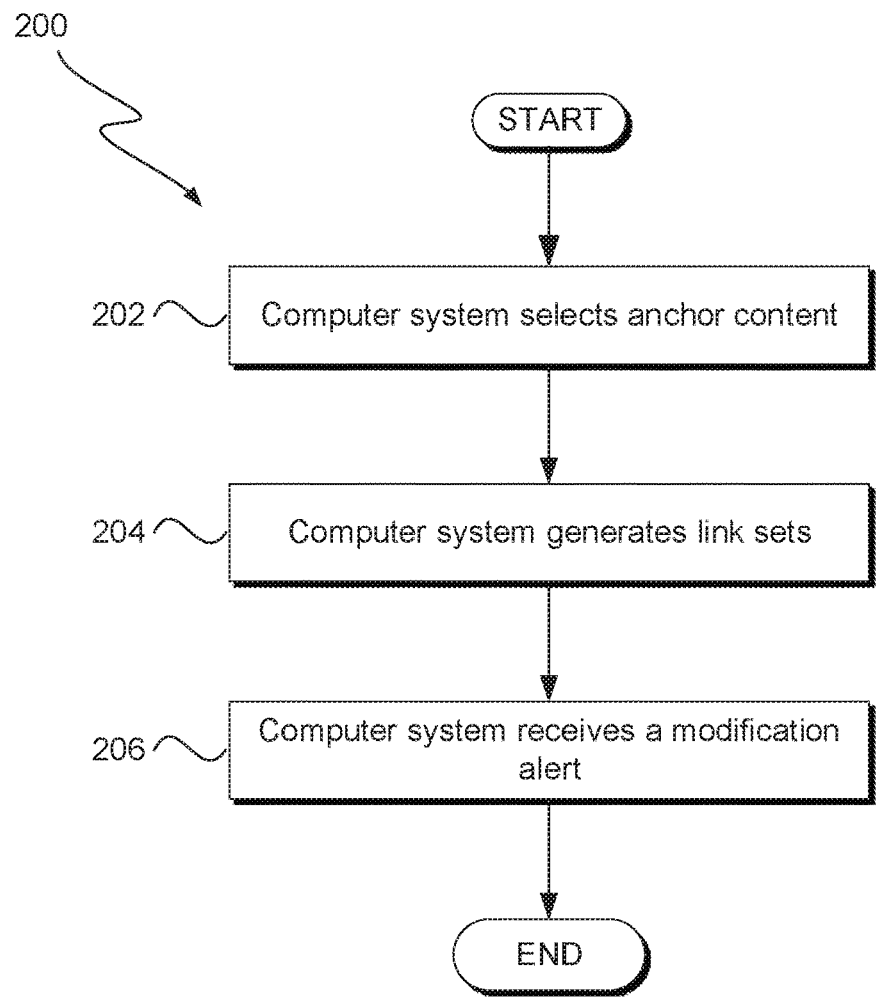
FIG. 2 illustrates operational processes of an application to manage notification control of document modification, on a computing device within the environment of FIG. 1, in accordance with an exemplary embodiment of the present invention.

FIG. 2 is a flowchart depicting operations for executing a document modification alert system for computing environment 100, in accordance with an illustrative embodiment of the present invention. More specifically, FIG. 2, depicts combined overall operations 200, of master document application 132 executing on SAN 130. In various embodiments, FIG. 2, depicts combined overall operations of 200, of content notification program 122 executing on computer system 120A. In some embodiments, FIG. 2, depicts combined overall operations 200, of content notification program 126 executing on computer system 120B. FIG. 2 is not limited to computer system 120A and computer system 120B and can include any number of computer systems in overall operations 200. In various embodiments depicted in FIG. 2, combined overall operations 200, can be accomplished by any of the aforementioned programs. It should be appreciated that FIG. 2 provides an illustration of one implementation and does not imply any limitations with regard to the environments in which different embodiments may be implemented. Many modifications to the depicted environment may be made. In one embodiment of flowchart 200, the series of operations can be performed in any order. In another embodiment, the series of operations, of flowchart 200, can be performed simultaneously. Additionally, the series the operations, in flowchart 200, can be terminated at any operations. In addition to the features previously mentioned, any operations, of flowchart 200, can be resumed at any time.

In operation 202, a computer program, including, but not limited to, content notification program 122, content notification program 126 and/or master document application 132 operates to identify one or more master website content stored on database 134 and retrieves one or more master website content from database 134 and populates the selected one or more master website content on computer interface 124, computer interface 128, or various computer interfaces executing on various computer systems (not shown). In one embodiment and example, master document application 132 generates a local copy of the one or more master website content and communicates the local copy to computer system 120A. In some embodiments, master document application 132 populates the local copy on computer interface 124 and stores the local copy on computer system 120A. Master document application 132 operates to select one or more anchor contents from one or more master website content based, at least in part, on a set of user preferences. User preferences can include, but are not limited, the selection of specific master website content, categorically selected master website content, selected keywords, etc. One having ordinary skill in the art would understand that user preferences can include, but are not limited, selections made by a user of computer system 120A, computer system 120B and/or various computer systems that reference the plurality of master website content stored on a database, such as database 134. In various embodiments, content notification program 122 communicates program instructions to master document application 132 to identify one or more master website content stored on a database, such as database 134 and retrieve one or more master website content stored on the database. Content notification program 122 requests the one or more master website content from master document application 132, and content notification program 122 receives the master website content from master document application 132. Content notification program 122 populates the one or more master website content on computer interface 124. In some embodiments, content notification program 122 generates a local copy of the one or more master website content and stores the local copies on computer system 120A.

In operation 204, master document application 132 generates one or more link sets, that include, but is not limited to, one or more anchor contents from one or more master website content based, at least in part, on the user preferences that select the one or more anchor contents from one or more master website content. Master document application 132 stores the one or more link sets on computer system 120A.

In operation 206, master document application 132 monitors a plurality of master website content stored on database 134. In one embodiment and example, master document application 132 identifies that a change has been made to an anchor content of a master document stored on database 134. In various embodiments of the present invention, master document application 132 monitors one or more databases located on various servers that operate within computing environment 100 (not shown). In this embodiment, master document application 132 identifies one or more master website content stored on the one or more databases located on various servers that operate within computing environment 100 (not shown), and (i) retrieve one or more master website content stored on these databases or (ii) generate modification alerts based, at least in part, on the identification of changes made to one or more anchor contents of the one or more master website content. Additionally, in this embodiment, master document application 132 operates to communicate the one or more modification alerts based, at least in part, on whether computer system 120A, computer system 120B, and/or various computer systems (not shown) contain a link set that assigned the one or more anchor contents, to a docket, corresponding to the one or more modification alerts. In one embodiment and example, master document application 132 generates a modification alert based, at least in part, on the identification that a change has been made to an anchor content of a master document and communicates the modification alert to computer interface 124. In some embodiments, computer interface 124 populates the modification alert on computer system 120A. In another embodiment, master document application 132 communicates the modification alert to content notification program 122, with program instructions to store the modification alert on computer system 120A and to update, at least, a first link set status from "normal" to "warning" to indicate to the user of computer system 120A that a change has been made to an anchor content associated with, at least, the first link set.

In a second embodiment and example, master document application 132 monitors the plurality of master website content stored on database 134. Master document application 132 identifies one or more changes made to one or more anchor contents of one or more master website content. Master document application 132 operates to generate modification alerts based, at least, on each change made to one or more anchor contents on the one or more master website content. In one embodiment, master document application 132 identifies a plurality of changes to, at least, a first anchor content of, at least, a first master document. Master document application 132 operates to generate a plurality of modification alerts based, at least in part, on one or more changes to, at least, a first anchor content of, at least, a first master document. Master document application 132 operates to aggregate the plurality of modification alerts of changes to, at least, a first anchor content of, at least, a first master document. In one embodiment, master document application 132 generates a commentary data list based, at least in part, on the aggregation of the plurality of modification alerts and stores the commentary data list on SAN 130. In addition to storing the commentary data list, master document application 132 communicates the commentary data list to a computer system (i.e., computer system 120A) when (i) master document application 132 communicates one modification alert, (ii) master document application 132 receives program instructions instructing master document application 132 to communicate the modification alert, and/or (iii) content notification program 122 requests a modification alert. In addition to aggregating the plurality of modification alerts, master document application 132 identifies a plurality of link sets that selected, at least, the first anchor content of, at least, the first master document. Master document application 132 generates a single modification alert based, at least in part, on the aggregation of the plurality of modification alerts and communicates the single modification alert, based, at least in part, on the plurality of changes to, at least, a first anchor content of, at least, a first master document, to a computer system (i.e., computer system 120A). Wherein, master document application 132 communicates the single modification alert to computer interface 124, wherein, computer interface 124 populates the modification alert on computer system 120A. In various embodiments, content notification program 122 receives program instructions from master document application 132 to communicate the modification alert to computer interface 124 to populate the modification alert on computer system 120A.

Figure 3:
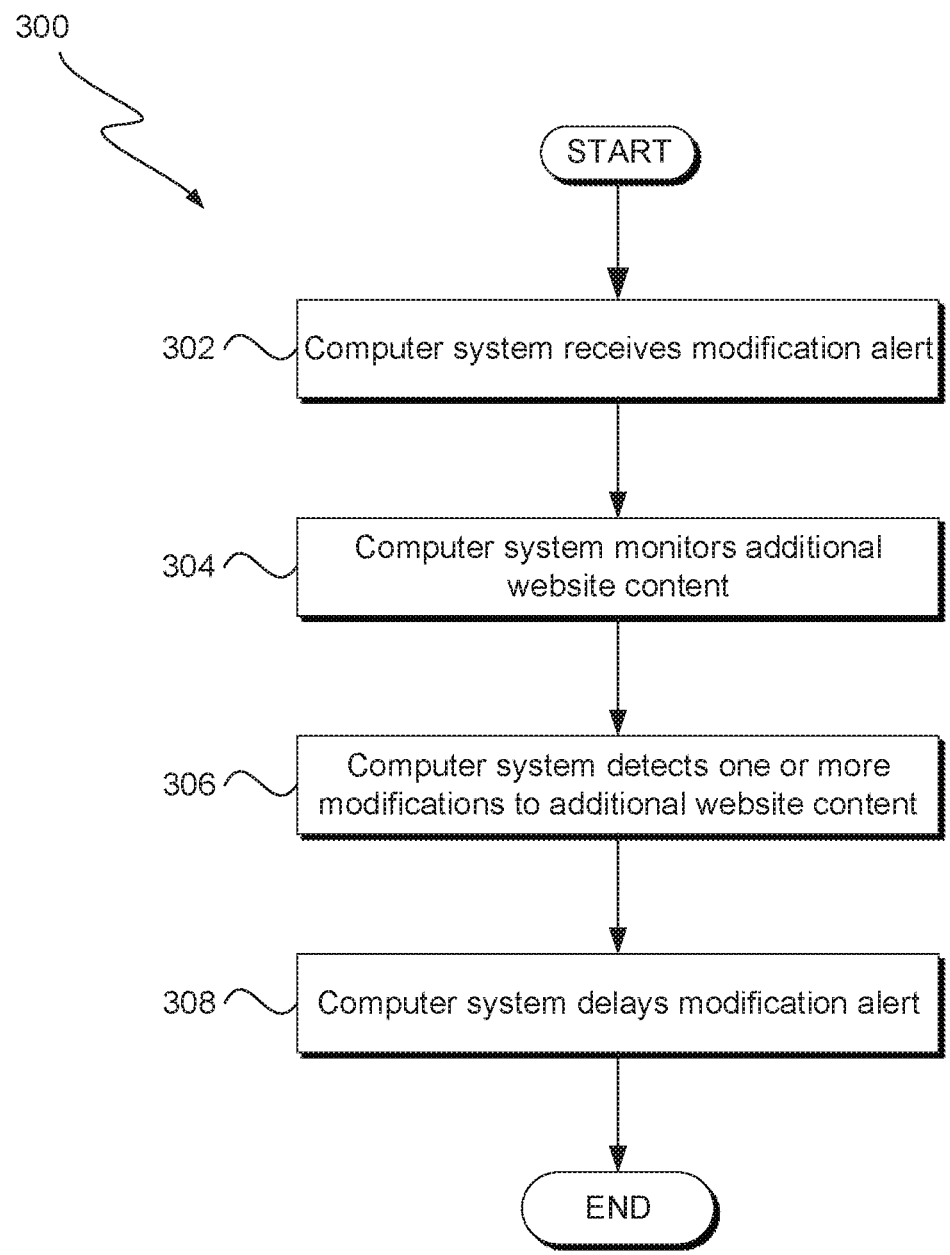
FIG. 3 illustrates operational processes of an application executing operations to monitor and detect document modifications, on a computing device within the environment of FIG. 1, in accordance with an exemplary embodiment of the present invention.

FIG. 3 is a flowchart depicting operations for executing a document modification alert system for computing environment 100, in accordance with an illustrative embodiment of the present invention. More specifically, FIG. 3, depicts combined overall operations 300, of master document application 132 executing on SAN 130. In some embodiments, operations 300 represents logical operations of master document application 132, wherein content notification program 122 and content notification program 126 represent interactions between logical units executing on computer system 120A and computer system 120B, respectively. It should be appreciated that FIG. 3, provides an illustration of one implementation and does not imply any limitations with regard to the environments in which different embodiments may be implemented. Many modifications to the depicted environment may be made. In one embodiment of flowchart 300, the series of operations can be performed in any order. In another embodiment, the series of operations of flowchart 300, can be performed simultaneously. Additionally, the series of operations, in flowchart 300, can be terminated at any operation. In addition to the features previously mentioned, any operations, of flowchart 300, can be resumed at any time.

In operation 302, master document application 132 communicates a modification alert to computer system 120A, computer system 120B and/or various computer systems (not shown). In various embodiments, master document application 132 generates a modification alert based, at least in part, on changes made to an anchor content included as part of a master document stored on database 134. The present invention recognizes that changes made to anchor content may be made by master document application 132 receiving program instructions from a user of computer system 120A, computer system 120B and/or various computer systems (not shown). In various embodiments, master document application 132 makes changes to one or more anchor contents based, at least, on a set of user preferences, as recognized above. In some embodiments, master document application 132 receives program instructions from content notification program 122, content notification program 126 and/or various programs operating on various computer systems (not shown) to communicate one or more master website content to these programs, wherein, these programs make changes to the master document and communicate the edited master document to master document application 132. In these embodiments, master document application 132 monitors for changes to be made to one or more anchor contents of one or more master website content, and generates a modification alert based, at least in part, on those changes to the one or more anchor contents. In addition to master document application 132 monitoring for changes made to anchor contents, master document application 132 generates, at least, a single modification alert and communicates the modification alert to a computer system (i.e., computer system 120A, computer system 120B). In some such embodiments, the computer system is configured to, via executed computer programming, maintain, at least, one link set that has assigned, at least, one anchor content that master document application 132 has monitored to have been changed.

In operation 304, master document application 132 monitors the activity of a plurality of master website content stored on database 134. In various embodiments of the present invention, master document application 132 continues to monitor a plurality of master website content stored on database 134 after master document application 132 communicated a modification alert regarding, at least, one of the master website content stored on database 134. In one embodiment and example, as recognized above, master document application 132 identifies a change made to a first anchor content of a first master document, wherein, master document application 132 generates a first modification alert and communicates the modification alert to a computer system (i.e., computer system 120A, computer system 120B, etc.) that maintains a link set that assigned the first anchor content of the first master document to the docket of the link set. In addition, master document application 132 continues to monitor a plurality of master website content, including, but not limited to, the first master document that master document application 132 communicated a modification alert to a computer system.

In operation 306, master document application 132 identifies, at least, a second change to a first anchor content of the first master document during a predefined period of time. In some embodiments of the present invention, master document application 132 identifies additional changes to one or more anchor contents during a predefined period of time (i.e., time intervals), which includes, but is not limited, to one-hour increments, four-hour increments, etc. The present invention recognizes that a user of a computer system (i.e., computer system 120A) defines a period of time using user preferences. The user preferences can include, but are not limited to, incremental time periods such as, one-hour, four-hours, etc. In various embodiments, master document application 132 operates to delay the modification alert of the second change and continues to monitor for additional changes to the first anchor content of the first master document. In this embodiment, master document application 132 operates to identify additional changes to, at least, the first anchor content of the first master document during, at least, an hourly time cycle. Additionally, master document application 132 operates to aggregate the additional changes to the, at least, first anchor content of the first master document during the predefined period of time and stores the changes on database 134 (operation 308). In some embodiments, master document application 132 communicates a second modification alert, containing the additional changes to the first anchor content of the first master document, to a computer system (i.e., computer system 120A, computer system 120B, etc.) with program instructions to include the additional changes to the first modification alert and stores the additional changes on the computer system. In some embodiments of the present invention, master document application 132 communicates a second modification alert, as recognized above, to a computer system (i.e., computer system 120A, computer system 120B, etc.) with program instructions to replace the first modification alert with the second modification alert and stores the additional changes on the computer system.

In various embodiments of the present invention, master document application 132 operates to identify a plurality of changes made to one or more anchor contents to one or more master website content. In one embodiment and example, master document application 132 identifies if, at least, a first modification alert has been communicated to a first link set on a computer system (i.e., computer system 120A), wherein, the first modification alert, includes, but is not limited to, a first anchor content of a first master document, that has been communicated to a first link set. In this embodiment, if master document application 132 identifies that, at least, a first modification alert has already been communicated to a first link set, regarding the first anchor content of a first master document, master document application 132 aggregates the generation of modification alerts regarding one or more additional changes to the first anchor content of a first master document and delays the communication of one or more modification alerts to a computer system (operation 308). Master document application 132 generates a single modification alert, regarding the additional modification alerts, and communicates the single modification alert to a computer system.

Figure 4:
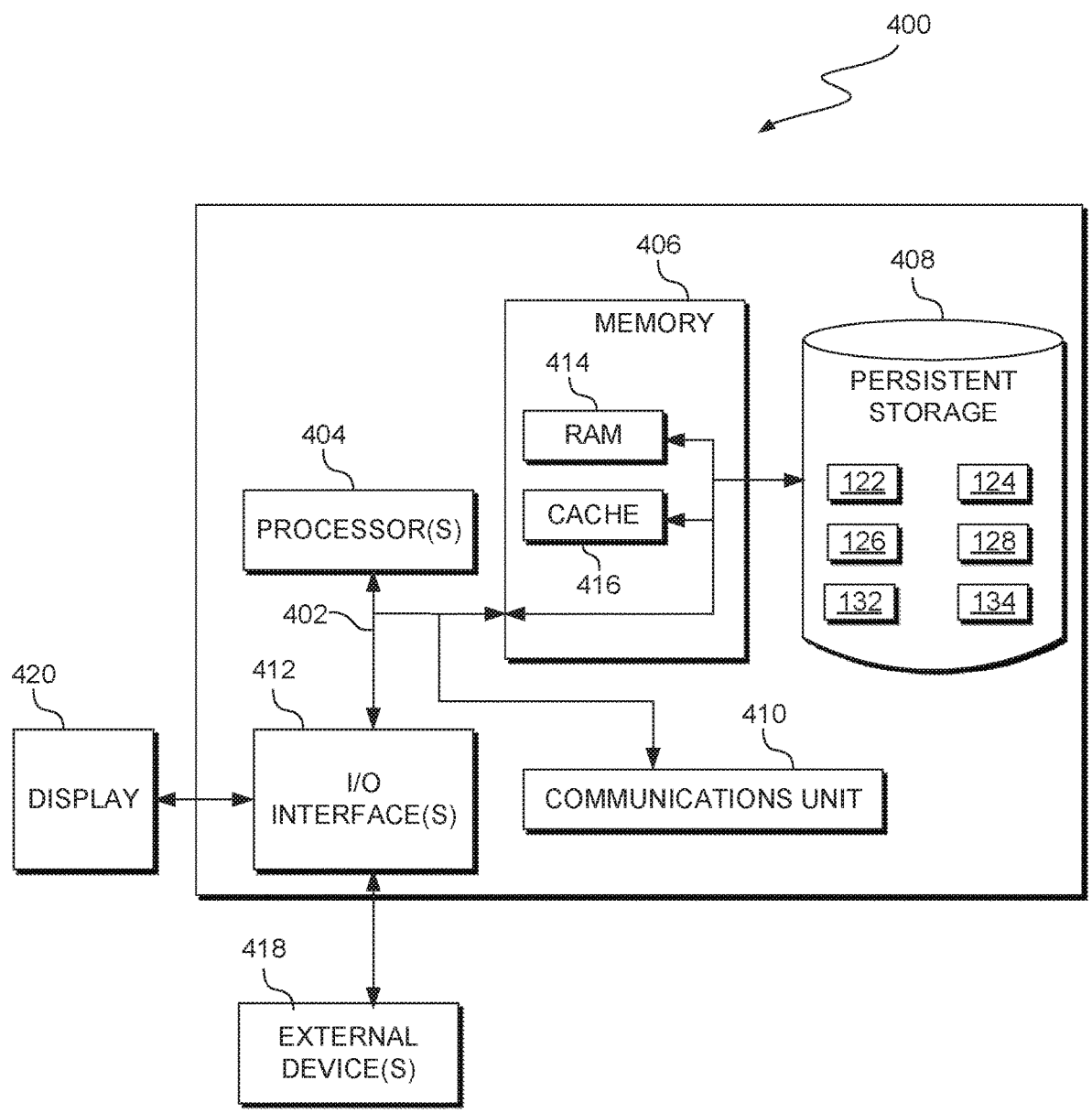
FIG. 4 depicts a block diagram of components of one or more computing devices within the computing environment depicted in FIG. 1, in accordance with an exemplary embodiment of the present invention.

FIG. 4 depicts a block diagram, 400, of components of computer system 120A, computer system 120B and SAN 130, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computer system 120A, computer system 120B and SAN 130 include communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media.

Content notification program 122, computer interface 124, content notification program 126, computer interface 128, master document application 132 and database 134 are stored in persistent storage 408 for execution and/or access by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including resources of network 110. In these examples, communications unit 410 includes one or more network interface cards. Communications unit 410 may provide communications through the use of either or both physical and wireless communications links. Content notification program 122, computer interface 124, content notification program 126, computer interface 128, master document application 132 and database 134 may be downloaded to persistent storage 408 through communications unit 410.

I/O interface(s) 412 allows for input and output of data with other devices that may be connected to computer system 120A, computer system 120B and SAN 130. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention, e.g., Content notification program 122, computer interface 124, content notification program 126, computer interface 128, master document application 132 and database 134 can be stored on such portable computer-readable storage media and can be loaded onto persistent storage 408 via I/O interface(s) 412. I/O interface(s) 412 also connect to a display 420.

Display 420 provides a mechanism to display data to a user and may be, for example, a computer monitor, or a television screen.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be noted that the term(s) such as, for example, "Smalltalk" and the like may be subject to trademark rights in various jurisdictions throughout the world and are used here only in reference to the products or services properly denominated by the marks to the extent that such trademark rights may exist.

What is claimed is:

1. A computer-implemented method, the method comprising:

identifying, by one or more processors, individually separable anchor contents associated with a document stored on a database, wherein the document is accessible by authorized users;

identifying, by one or more processors, respective selections of individually separable anchor contents made by the authorized users, wherein the selections indicate that respective authorized users wish to receive change alerts for respective individually separable anchor contents;

generating, by one or more processors, link sets for the authorized users based, at least in part, on the selections, wherein the link sets identify connections between the individually separable anchor contents associated with the document stored on the database and local copies of the document on respective client devices of the authorized users, and wherein the link sets include at least a first link set and a second link set;

detecting, by one or more processors, changes made to one or more of the individually separable anchor contents associated with the document stored on the database by at least one of the authorized users; and generating, by one or more processors, an alert based, at least in part, on the detection of the changes made to the one or more of the individually separable anchor contents associated with the document and on the link sets associated with the changed one or more of the individually separable anchor contents, wherein:

the first link set identifies a connection between a first subset of the individually separable anchor contents and a local copy of the document on a client device of a first authorized user, the second link set identifies a connection between a second subset of the individually separable anchor contents and a local copy of the document on a client device of a second authorized user, the first subset and the second subset are different from each other.

2. The computer-implemented method of claim 1, the method further comprising:

generating, by the one or more processors, a copy of the document stored on the database;

sending, by the one or more processors, the copy of the document to one or more of the client devices of the authorized users; and storing, by the one or more processors, the link sets on the database in response to the copy of the document being stored on the one or more of the client devices.

3. The computer-implemented method of claim 1, the method further comprising:

receiving, by the one or more processors, a request to populate the document from a client device of the client devices;

retrieving, by the one or more processors, the document from the database; and populating, by the one or more processors, the document.

4. The computer-implemented method of claim 1, the method further comprising:

detecting, by the one or more processors, activity associated, at least, with the one or more of the individually separable anchor contents associated with the document stored on the database;

generating, by the one or more processors, a list of changes made to each respective anchor content of the one or more of the individually separable anchor contents; and storing, by the one or more processors, the list of changes on the database.

5. The computer-implemented method of claim 1, the method further comprising:

communicating, by the one or more processors, the alert to a client device of the client devices.

6. The computer-implemented method of claim 1, the method further comprising:
 detecting, by the one or more processors, additional changes made to the one or more of the individually separable anchor contents associated with the document;
 generating, by the one or more processors, an inventory of changes based, at least in part, on the additional changes made to the one or more of the individually separable anchor contents associated with the document; and
 communicating, by the one or more processors, the inventory of changes to a client device of the client devices.

7. The method of claim 6,
 wherein the generating of the alert is further based, at least in part, on the one or more additional changes made to the one or more of the individually separable anchor contents.

8. A computer program, the computer program product comprising:
 one or more computer-readable storage media and program instructions stored on the one or more computer-readable storage media, the stored program instructions comprising:
 program instructions to identify individually separable anchor contents associated with a document stored on a database, wherein the document is accessible by authorized users;
 program instructions to identify respective selections of individually separable anchor contents made by the authorized users, wherein the selections indicate that respective authorized users wish to receive change alerts for respective individually separable anchor contents;
 program instructions to generate link sets for the authorized users based, at least in part, on the selections, wherein the link sets identify connections between the individually separable anchor contents associated with the document stored on the database and local copies of the document on respective client devices of the authorized users, and wherein the link sets include at least a first link set and a second link set;
 program instructions to detect changes made to one or more of the individually separable anchor contents associated with the document stored on the database by at least one of the authorized users; and
 program instructions to generate an alert based, at least in part, on the detection of the changes made to the one or more of the individually separable anchor contents associated with the document and on the link sets associated with the changed one or more of the individually separable anchor contents,
 wherein:
  the first link set identifies a connection between a first subset of the individually separable anchor contents and a local copy of the document on a client device of a first authorized user,
  the second link set identifies a connection between a second subset of the individually separable anchor contents and a local copy of the document on a client device of a second authorized user,
  the first subset and the second subset are different from each other.

9. The computer program product of claim 8, the stored program instructions further comprising:
 program instructions to generate a copy of the document stored on the database;
 program instructions to send the copy of the document to one or more of the client devices of the authorized users; and
 program instructions to store the link sets on the database in response to the copy of the document being stored on the one or more of the client devices.

10. The computer program product of claim 8, the stored program instructions further comprising:
 program instructions to receive a request to populate the document from a client device of the client devices;
 program instructions to retrieve the document from the database; and
 program instructions to populate the document.

11. The computer program product of claim 8, the stored program instructions further comprising:
 program instructions to detect activity associated, at least, with the one or more of the individually separable anchor contents associated with the document stored on the database;
 program instructions to generate a list of changes made to each respective anchor content of the one or more of the individually separable anchor contents; and
 program instructions to store the list of changes on the database.

12. The computer program product of claim 8, the stored program instructions further comprising:
 communicating, by the one or more processors, the alert to a client device of the client devices.

13. The computer program product of claim 8, the stored program instructions further comprising:
 program instructions to detect additional changes made to the one or more of the individually separable anchor contents associated with the document;
 program instructions to generate an inventory of changes based, at least in part, on the additional changes made to the one or more of the individually separable anchor contents associated with the document; and
 program instructions to communicate the inventory of changes to a client device of the client devices.

14. The computer program product of claim 8,
 wherein the generating of the alert is further based, at least in part, on the one or more additional changes made to the one or more of the individually separable anchor contents.

15. A computer system, the computer system comprising:
 one or more computer processors;
 one or more computer readable storage medium; and
 program instructions stored on the computer readable storage medium for execution by at least one of the one or more processors, the stored program instructions comprising:
 program instructions to identify individually separable anchor contents associated with a document stored on a database, wherein the document is accessible by authorized users;
 program instructions to identify respective selections of individually separable anchor contents made by the authorized users, wherein the selections indicate that respective authorized users wish to receive change alerts for respective individually separable anchor contents;
 program instructions to generate link sets for the authorized users based, at least in part, on the selections, wherein the link sets identify connections between the individually separable anchor contents associated with the document stored on the database and local copies of the document on respective client devices of the authorized users, and wherein the link sets include at least a first link set and a second link set;

program instructions to detect changes made to one or more of the individually separable anchor contents associated with the document stored on the database by at least one of the authorized users; and program instructions to generate an alert based, at least in part, on the detection of the changes made to the one or more of the individually separable anchor contents associated with the document and on the link sets associated with the changed one or more of the individually separable anchor contents, wherein:
- the first link set identifies a connection between a first subset of the individually separable anchor contents and a local copy of the document on a client device of a first authorized user,
- the second link set identifies a connection between a second subset of the individually separable anchor contents and a local copy of the document on a client device of a second authorized user,
- the first subset and the second subset are different from each other.

16. The computer system of claim 15, the stored program instructions further comprising:

program instructions to generate a copy of the document stored on the database;

program instructions to send the copy of the document to one or more of the client devices of the authorized users; and program instructions to store the link sets on the database in response to the copy of the document being stored on the one or more of the client devices.

17. The computer system of claim 15, the stored program instructions further comprising:

program instructions to receive a request to populate the document from a client device of the client devices;

program instructions to retrieve the document from the database; and program instructions to populate the document.

18. The computer system of claim 15, the stored program instructions further comprising:

program instructions to detect activity associated, at least, with the one or more of the individually separable anchor contents associated with the document stored on the database;

program instructions to generate a list of changes made to each respective anchor content of the one or more of the individually separable anchor contents; and program instructions to store the list of changes on the database.

19. The computer system of claim 15, the stored program instructions further comprising:

communicating, by the one or more processors, the alert to a client device of the client devices.

20. The computer system of claim 15, the stored program instructions further comprising:

program instructions to detect additional changes made to the one or more of the individually separable anchor contents associated with the document;

program instructions to generate an inventory of changes based, at least in part, on the additional changes made to the one or more of the individually separable anchor contents associated with the document; and program instructions to communicate the inventory of changes to a client device of the client devices.

* * * * *